Figure 1:
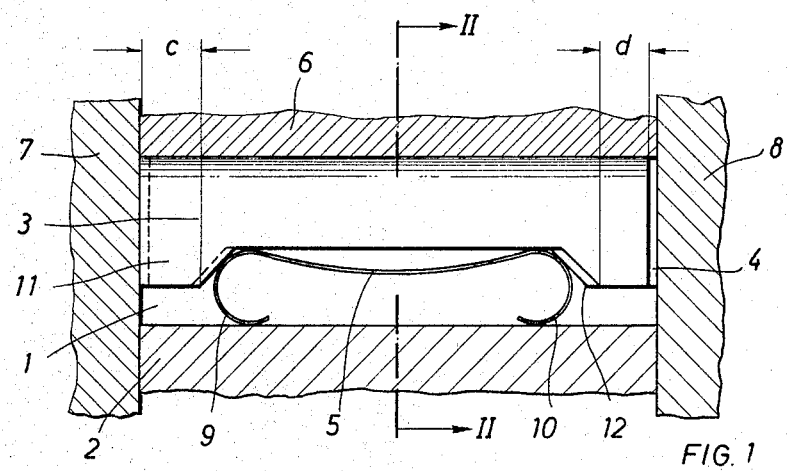

Inventor
Manfred FRENZEL by *Melвin D. Crosley*

United States Patent Office 3,286,699
Patented Nov. 22, 1966

3,286,699
RADIAL SEALING DEVICE FOR ROTARY PISTON ENGINE
Manfred Frenzel, Burscheid, near Cologne, Germany, assignor to Goetzewerke Friedrich Goetze Aktiengesellschaft, Burscheid, near Cologne, Germany
Filed Jan. 3, 1964, Ser. No. 335,618
Claims priority, application Germany, Jan. 5, 1963,
G 36,787
5 Claims. (Cl. 123—8)

The invention disclosed herein is concerned with a radial sealing device comprising a plurality of sealing bars, for use in connection with a plural-corner piston of an internal combustion engine of the rotating piston type, having grooves formed at the corners thereof for receiving the sealing bars which are axially and radially movably arranged therein.

The static preloading in connection with radial sealing bars was heretofore effected by means of springs formed with a U-profile, disposed at the bases of the respective piston grooves and resting with the backs thereof in engagement with the corresponding sealing bars. Dished springs were used for pressing into position the sealing bolts, which close the gaps between the respective radial sealing bar and the axial sealing member. It is also known to press the sealing bolts and the radial sealing bars by means of a common spring against the respective opposing slide surfaces. A spring wire was for this purpose constructed so as to form a bow-like bracket the free ends of which engaged respectively the two sealing bolts while the central part of the bracket rested against the back of the sealing bar.

It is also known to insert two radial sealing bars in common into a piston groove so as to be axially mutually shiftable therein. The relative axial motion was produced by built-in camming members of triangular or circular configuration which were journalled in mutually displaced recesses of corresponding configuration, formed in the sealing bars. These camming members are by the action of centrifugal forces alternately pressed against the flanks of the recesses, thereby causing the two sealing bars to slide axially apart.

The present invention proceeds from the thought that it is for internal combustion engines of the rotating piston type particularly advantageous to equalize or compensate the thermal expansions occurring between the enveloping part, the piston and the two side parts, by the provision of a movable radial seal.

It is in accordance with the invention proposed to use two sealing bars which are, as seen in tangential direction, of a configuration resembling a flat U, the legs being in axial direction of different width, such bars being inserted in a piston groove with the narrow leg of one bar disposed adjacent the wider leg of the other bar, so that the bars can be axially spread apart by spring pressure applied thereto. The spring used for this purpose rests against the flank of the wider leg. The sealing bars are in this manner caused to lie with their ends firmly in engagement with the lateral or side parts of the assembly, and stresses appearing in operation can be elastically equalized or compensated, thus considerably improving the gas seal.

Figure 2:
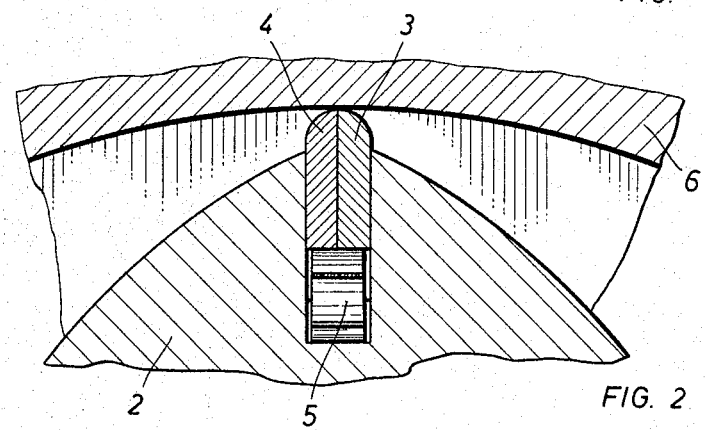

The various objects and features of the invention will appear from the appended claims and from the description of an embodiment which is rendered below with reference to the accompanying drawing, wherein FIG. 1 shows a longitudinal sectional view;
FIG. 2 represents a sectional view taken along lines A–B of FIG 1; and
FIG. 3 is a plan view of the arrangement according to the invention.

Referring now to the drawing, at a corner of the piston 2 is formed a groove 1 in which are disposed the sealing bars 3 and 4. The spring 5 presses the sealing bars 3, 4 radially against the inner wall of the enveloping (cylinder) body 6 and also against the inner walls of the laterally disposed side portions 7 and 8. The resilient radial pressure force on the sealing bars is effected by the semicircular or bow-like camming portions 9, 10 at the ends of the spring 5. The camming portions 9, 10 of the spring 5 exert pressure in axial direction on the leg 11 of the sealing bar 3 and on the leg 12 of the sealing bar 4, respectively, so that the two sealing bars are axially spread apart with their outer ends in engagement with the inner walls of the side members 7 and 8. The width $c$ of the leg 11 of the sealing bar 3 exceeds the width $d$ of the leg 12 of the sealing bar 4.

It may be seen from the sectional view shown in FIG. 2, which is taken along lines A–B in FIG. 1, that the sealing bars 3, 4 are by the radial force exerted thereon by the spring 5, pressed against the inner wall of the enveloping body or cylinder 6.

Figure 3:
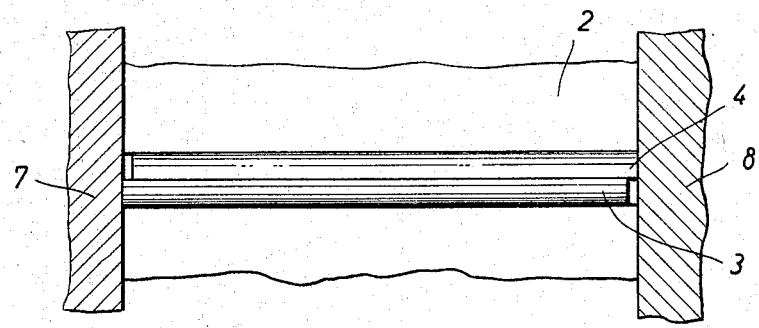

The axial shifting of the sealing bars 3, 4 is clearly apparent from FIG. 3.

As may be seen from the drawing, the spring 5 is advantageously formed by a band with ends 9 and 10 thereof extending in semi-circular configuration and resting against the back of the sealing bars 3, 4 and against the base of the groove, thereby also effecting the static preloading for the sealing bars in radial direction.

The spring may be advantageously utilized for simultaneously outwardly pressing the two respective cooperatively disposed sealing bolts. A separate spring may be provided for each sealing bar so as to increase the mobility of the bars one with respect to the other.

The insides of the legs of the sealing bars formed in flat U-configuration may be shaped obliquely, as shown in FIG. 1, and the motion thereof may be produced by wedge members or rollers which are spread apart by the action of a compression spring, so as to produce a component acting on the sealing bars in radial direction, such radial component being, of course, also present in the first described embodiment.

It is in accordance with the invention also possible to dispose the sealing bars in separate grooves formed in the piston and to effect the mutual shifting of the bars with the aid of separate springs.

Changes may be made within the scope and spirit of the appended claims which define what is believed to be new and desired to have protected by Letters Patent.

I claim:
1. A radial sealing device for use in connection with the piston of an internal combustion engine of the rotary piston type, which piston is provided with substantially radial grooves extending axially of the piston, a pair of sealing bars in face to face engagement in each said groove, each bar being radially and axially movably arranged in its respective groove and the individual bars of each pair of bars being independently of one another movable in the pertaining groove, the respective sealing bars when viewed in the tangential direction of said piston being generally U-shaped in configuration with the leg portions thereof at opposite ends of the bar and extending from the bar toward the bottom of the respective groove, the radial extent of each bar at the ends thereof being less than the radial extent of the pertaining groove, each bar having one leg portion on a respective end thereof narrower in the axial direction than the adjacent leg portion of the other bar, and spring means in the space located axially between the leg portions of each said pair of bars and located radially between the radially inner edge of said pair of bars and the bottom of said groove, said spring means bearing axially on the respective one leg portions of the pertaining said bars so as to bias the individual bars of the pair of bars in each groove in respectively opposite axial directions.

2. A sealing device according to claim 1 in which the said bars of each pair of bars in the region thereof between the said leg portions have the same dimension from the radially outer edge to the radially inner edge, and said spring means bearing also on said radially inner edges of the bars of each pair and biasing them radially outwardly in their pertaining groove.

3. A sealing device according to claim 2 in which the axially inner sides of said leg portions are convergent in the radially outer direction of said bars.

4. A sealing device according to claim 2 in which said spring means is in the form of a strip of spring material formed to generally circular configurations on the ends and which ends engage at one time the bottom of the groove and the axially inner sides of the respective said one leg portions of the pair of bars in the groove and the said radially inner edges of both of said bars in the region thereof immediately axially inwardly from the said leg portions thereof.

5. A sealing device according to claim 2 in which each bar is slightly shorter in axial length than the axial length of the pertaining groove.

References Cited by the Examiner
UNITED STATES PATENTS

| | | | |
|---|---|---|---|
| 933,326 | 9/1909 | McCune et al. | |
| 3,120,815 | 2/1964 | Froede | 123—8 X |
| 3,180,561 | 4/1965 | Paschke | 123—8 X |
| 3,207,426 | 9/1965 | Gassmann et al. | 123—8 X |
| 3,215,340 | 11/1965 | Lamm | 123—8 X |

MARK NEWMAN, *Primary Examiner.*

F. T. SADLER, *Assistant Examiner.*